United States Patent
Iwamoto et al.

(10) Patent No.: US 9,292,046 B2
(45) Date of Patent: Mar. 22, 2016

(54) DISPLAY DEVICE EXHIBITING EXCELLENT MAINTAINABILITY

(71) Applicants: Takahiro Iwamoto, Kanagawa (JP); Natsuki Hagiwara, Kanagawa (JP); Takashi Nakashima, Kanagawa (JP)

(72) Inventors: Takahiro Iwamoto, Kanagawa (JP); Natsuki Hagiwara, Kanagawa (JP); Takashi Nakashima, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 14/352,500

(22) PCT Filed: Oct. 4, 2012

(86) PCT No.: PCT/JP2012/076372
§ 371 (c)(1),
(2) Date: Apr. 17, 2014

(87) PCT Pub. No.: WO2013/061795
PCT Pub. Date: May 2, 2013

(65) Prior Publication Data
US 2014/0267957 A1    Sep. 18, 2014

(30) Foreign Application Priority Data

Oct. 28, 2011  (JP) ................. 2011-236745

(51) Int. Cl.
| | |
|---|---|
| *G06F 1/16* | (2006.01) |
| *H04N 5/64* | (2006.01) |
| *G06F 3/041* | (2006.01) |
| *G07G 1/00* | (2006.01) |
| *G02F 1/1333* | (2006.01) |

(52) U.S. Cl.
CPC ............ *G06F 1/1628* (2013.01); *G06F 1/1601* (2013.01); *G06F 1/1615* (2013.01); *G06F 3/041* (2013.01); *G07G 1/0018* (2013.01); *H04N 5/64* (2013.01); *G02F 1/13338* (2013.01); *G02F 1/133308* (2013.01); *G02F 2201/465* (2013.01);

(Continued)

(58) Field of Classification Search
CPC .......... G02F 1/13338; G02F 1/133308; G02F 2001/133314; G02F 2001/13332; G02F 2201/465; G02F 2202/28
USPC ............................. 349/12, 58, 122; 345/173
See application file for complete search history.

(56) References Cited

U.S. PATENT DOCUMENTS

| 6,532,152 B1 * | 3/2003 | White et al. ............... 361/692 |
| 7,960,913 B2 * | 6/2011 | Yee et al. .................. 313/512 |

(Continued)

FOREIGN PATENT DOCUMENTS

| CN | 1499356 A | 5/2004 |
| CN | 201041666 Y | 3/2008 |

(Continued)

OTHER PUBLICATIONS

Communication dated Dec. 3, 2014 from the State Intellectual Property Office of People's Republic China in counterpart application No. 201280051130.7.

*Primary Examiner* — Paisley L Arendt
(74) *Attorney, Agent, or Firm* — Sughrue Mion, PLLC

(57) ABSTRACT

Provided is a display device, including: a display unit (31); a touch panel (32) stacked on a front part of the display unit (31); and a case for housing the touch panel (32) and the display unit (31). The case includes: a rear case (21); and a front case (22) removably attached to the rear case (21), which has an opening portion for exposing a touch detection region and a visible region of the touch panel (32) and the display unit (31) stacked together. The display unit (31) is mounted to the rear case (21), and the touch panel (32) is mounted to the front case (22).

4 Claims, 11 Drawing Sheets

(52) U.S. Cl.
CPC ..... *G02F 2202/28* (2013.01); *G06F 2200/1612* (2013.01)

(56) References Cited

U.S. PATENT DOCUMENTS

| | | | | |
|---|---|---|---|---|
| 8,462,517 B2* | 6/2013 | Wojack et al. | ................ | 361/802 |
| 2011/0080389 A1* | 4/2011 | Ishikawa et al. | ............. | 345/207 |

FOREIGN PATENT DOCUMENTS

| | | | | |
|---|---|---|---|---|
| CN | 102043505 A | | 5/2011 | |
| JP | 08094993 A | * | 4/1996 | .............. G02F 1/133 |
| JP | 10-207630 A | | 8/1998 | |
| JP | 2005-74554 A | | 3/2005 | |
| JP | 2008-181365 A | | 8/2008 | |
| JP | 2008-261987 A | | 10/2008 | |
| JP | 2011-209333 A | | 10/2011 | |

* cited by examiner

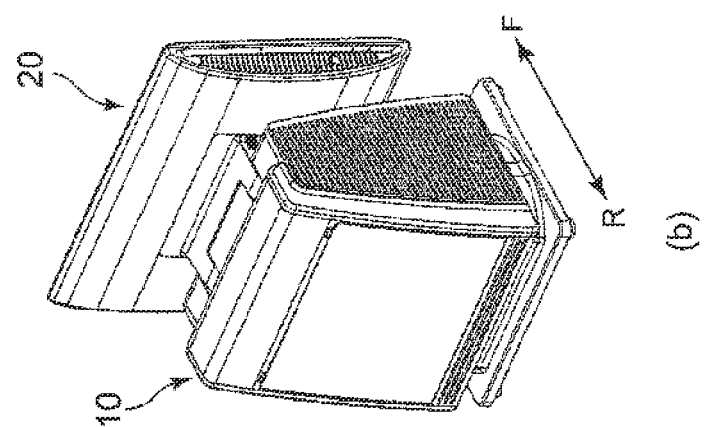
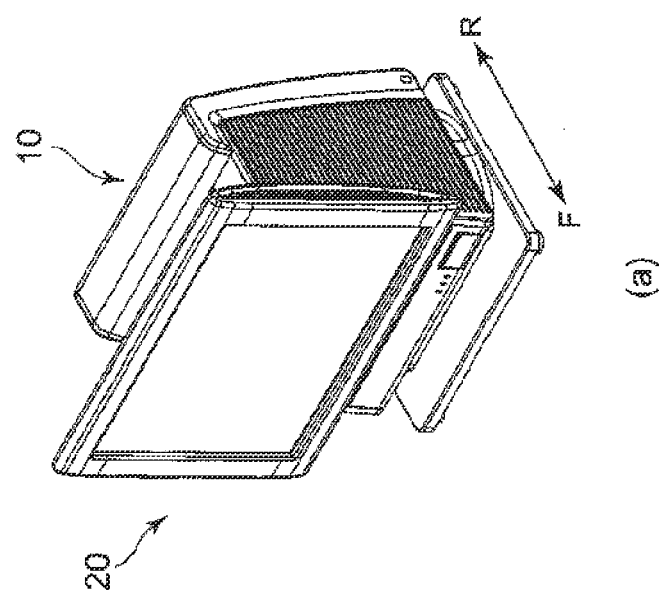
FIG. 1

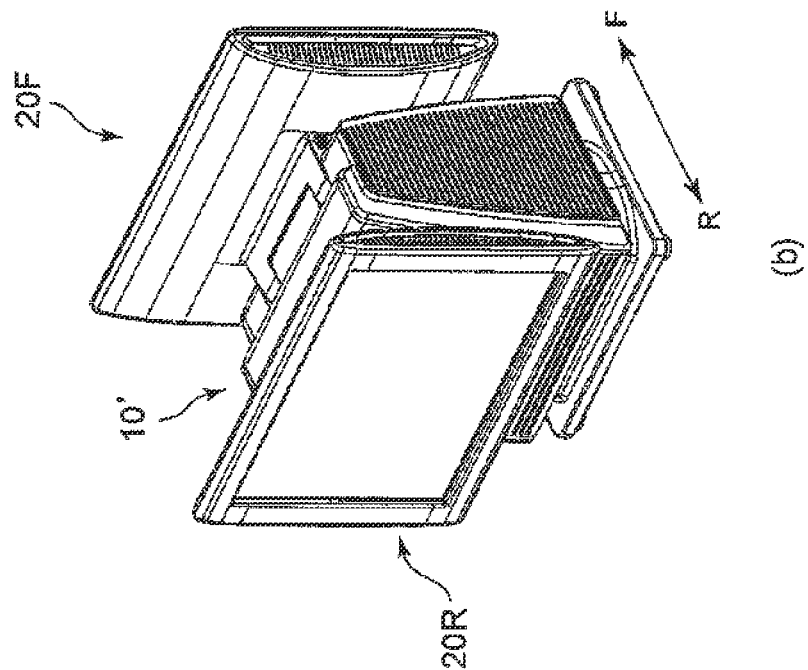
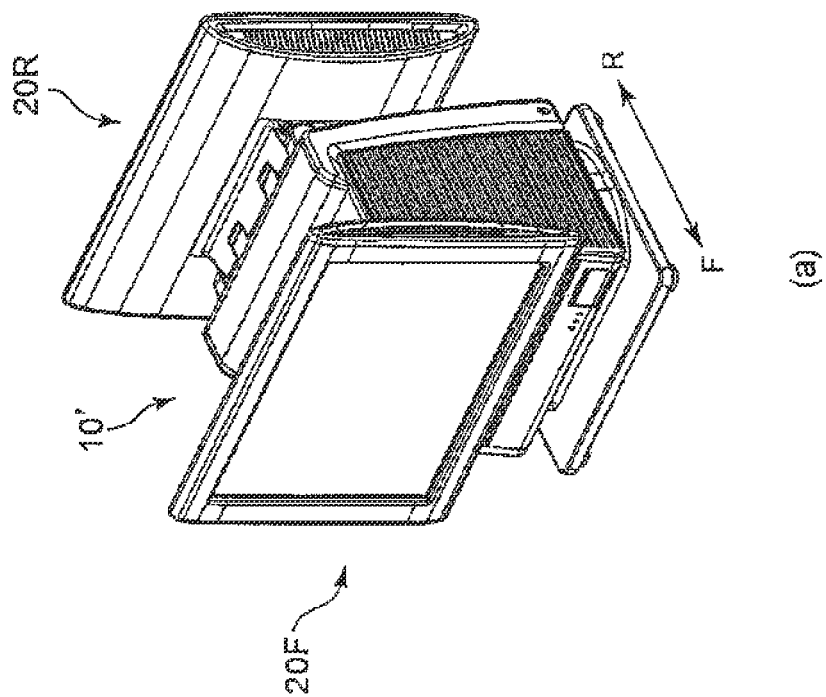
FIG. 11

DISPLAY DEVICE EXHIBITING EXCELLENT MAINTAINABILITY

CROSS REFERENCE TO RELATED APPLICATIONS

This application is a National Stage of International Application No. PCT/JP2012/076372 filed Oct. 4, 2012, claiming priority based on Japanese Patent Application No. 2011-236745 filed Oct. 28, 2011, the contents of all of which are incorporated herein by reference in their entirety.

TECHNICAL FIELD

This invention relates to a display device including a touch panel.

BACKGROUND ART

This type of display device is used as, for example, a peripheral device for an electronic device such as a POS terminal device, or a display section constructed integrally with a main body of an electronic device as one component of the electronic device.

In general, the display device including a touch panel includes a display unit such as a liquid crystal panel, a touch panel arranged on a front part of the display unit, and a casing for housing and supporting the display unit and the touch panel.

This type of display device is disclosed in, for example, Patent Literature 1. Note that, Patent Literature 1 discloses a teaching operation unit serving as an input device including a display unit. The teaching operation unit has a configuration corresponding to that of the display device including a touch panel. The display device includes a case of the teaching operation unit having an opening portion that defines a display region and a touch region, a touch panel arranged on the opening portion inside the case through an intermediation of a first packing member, and a display unit arranged on the touch panel through an intermediation of a second packing member and fixed to the case with screws. In other words, the touch panel and the display unit are fixed onto an inner surface of the case under a so-called co-fastening state using common screws.

CITATION LIST

Patent Literature

Patent Literature 1: JP-A-2005-074554

DISCLOSURE OF THE INVENTION

By the way, when the display device including a touch panel is used over a long period of time, there is a risk in that the display unit including a backlight unit may break down and the touch panel may also break down.

When maintenance inspection, repair, or replacement of the touch panel is to be carried out in the related-art display devices including the display device disclosed in Patent Literature 1, the touch panel cannot be removed unless the display unit is removed through work of opening the case, work of unfastening the screws used for fixing the display unit to the case, and the like. Therefore, there is a problem of a drawback to the maintainability of the device.

In view of the above, it is an object of this invention to provide a display device exhibiting excellent maintainability of built-in devices including a touch panel.

According to one embodiment of this invention, there is provided a display device, including: a display unit; a touch panel stacked on a front part of the display unit; and a case for housing the touch panel and the display unit, the case including: a rear case; and a front case removably attached to the rear case, the front case having an opening portion for exposing a touch detection region and a visible region of the touch panel and the display unit stacked together, the display unit being mounted to the rear case, the touch panel being mounted to the front case.

BRIEF DESCRIPTION OF THE DRAWINGS

FIG. 1 includes (a) and (b) which are perspective views of a display device according to a first embodiment of this invention.

FIGS. 6(a) and 6(b) are perspective views of the rear case and the front case, and FIG. 6(c) is a perspective view of a touch panel alone.

FIG. 11 includes (a) and (b) which are perspective views of a modification example of the display device according to the first embodiment of this invention.

BEST MODE FOR EMBODYING THE INVENTION

Figure 2:
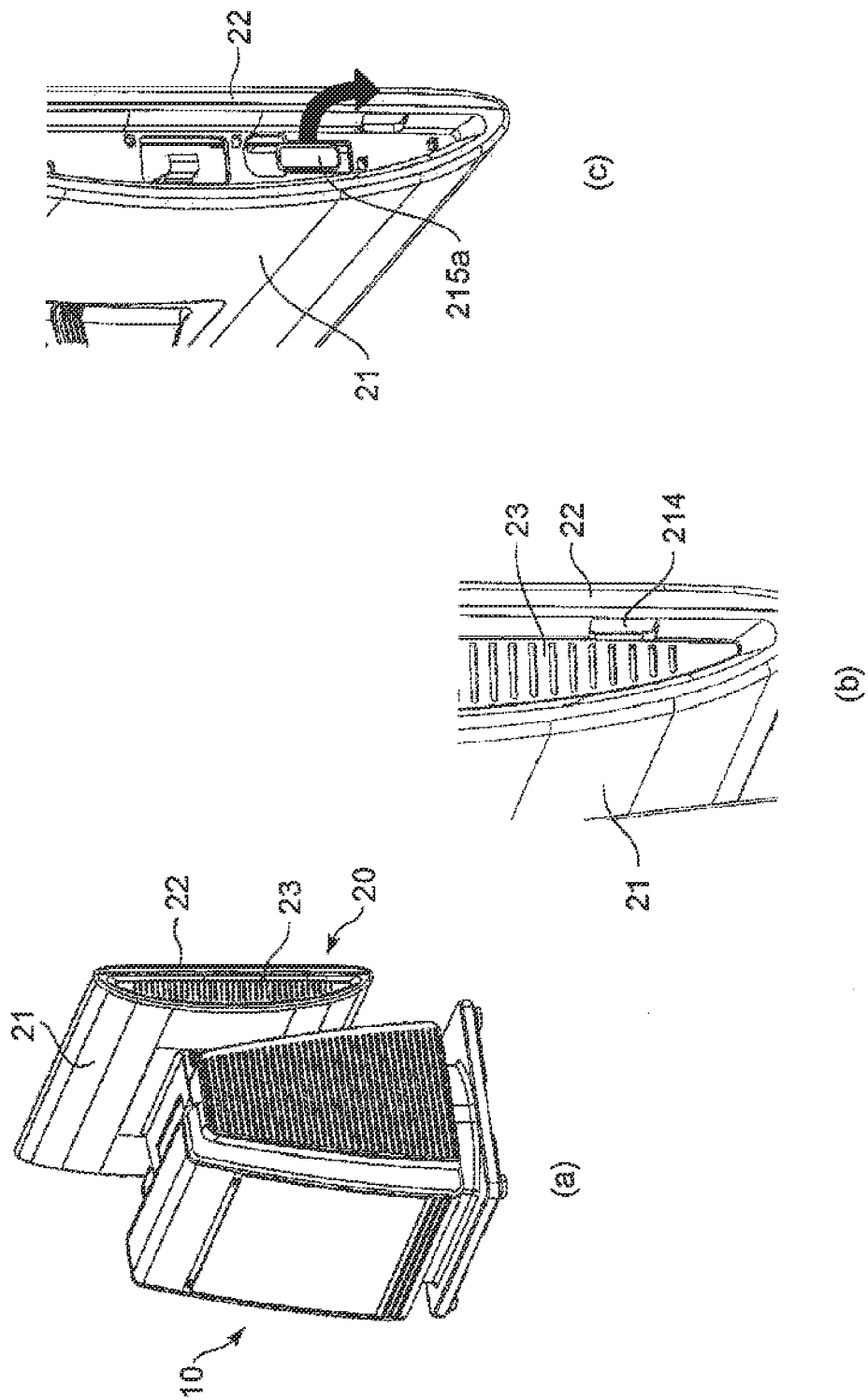
FIG. 2 includes (a) to (c) which are perspective views of a side panel and a disengagement lever, for illustrating a touch panel mounting structure in the display device according to the first embodiment of this invention.

A display device of this invention includes a display unit, a touch panel stacked on a front part of the display unit, and a case for housing the touch panel and the display unit. The case includes a rear case, and a front case removably attached to the rear case, which has an opening portion for exposing a touch detection region and a visible region of the touch panel and the display unit stacked together.

In this invention, in particular, the display unit is removably attached to the rear case, and the touch panel is removably mounted to the front case That is, according to this invention, the display unit and the touch panel, which are main built-in devices of a touch panel display device and may need to be repaired or replaced when being used over a long period of time, are individually mounted to the rear case and the front case that are separate components of the case. Thus, when maintenance inspection, repair, replacement, or the like is to be carried out, the touch panel and the display unit can be removed individually and mounted again individually.

Thus, the display device according to this invention exhibits excellent maintainability of the built-in devices including the touch panel.

Further, according to this invention, the touch panel, which is particularly prone to breakdown among the components of the display device because a person operates the touch panel, is mounted to the front case. Thus, the front case having the touch panel mounted thereto is prepared as a component for maintenance, and the entire front case is replaced when the touch panel breaks down, thereby being capable of easily coping with the breakdown of the touch panel within a short period of time. In particular, according to this invention, as compared to the rear case having mounted thereto a large number of devices and mechanisms such as a display part, a control circuit for the display part and the touch panel, an interface section between the display device and an information processing device to which the display device is applied, a power source section, a hinge mechanism, and a disengagement mechanism described later, the front case basically has a simple configuration in which only the touch panel is mounted, and hence the front case is suited to the preparation as the component for maintenance.

Now, a display device according to specific embodiments of this invention is described with reference to the drawings.
First Embodiment Referring to FIGS. 1(a) and 1(b), a display device according to a first embodiment of this invention is constructed integrally with a main body of a POS terminal device 10 through an intermediation of a hinge mechanism as a display section 20 on a front side of the POS terminal device. Note that, as illustrated in FIGS. 11(a) and 11(b), the display device according to this invention may be constructed integrally with a main body of a POS terminal device 10' through an intermediation of a hinge mechanism as each of a display section 20F on a front side of the POS terminal device and a display section 20R on a rear side of the POS terminal device.

Figure 3:
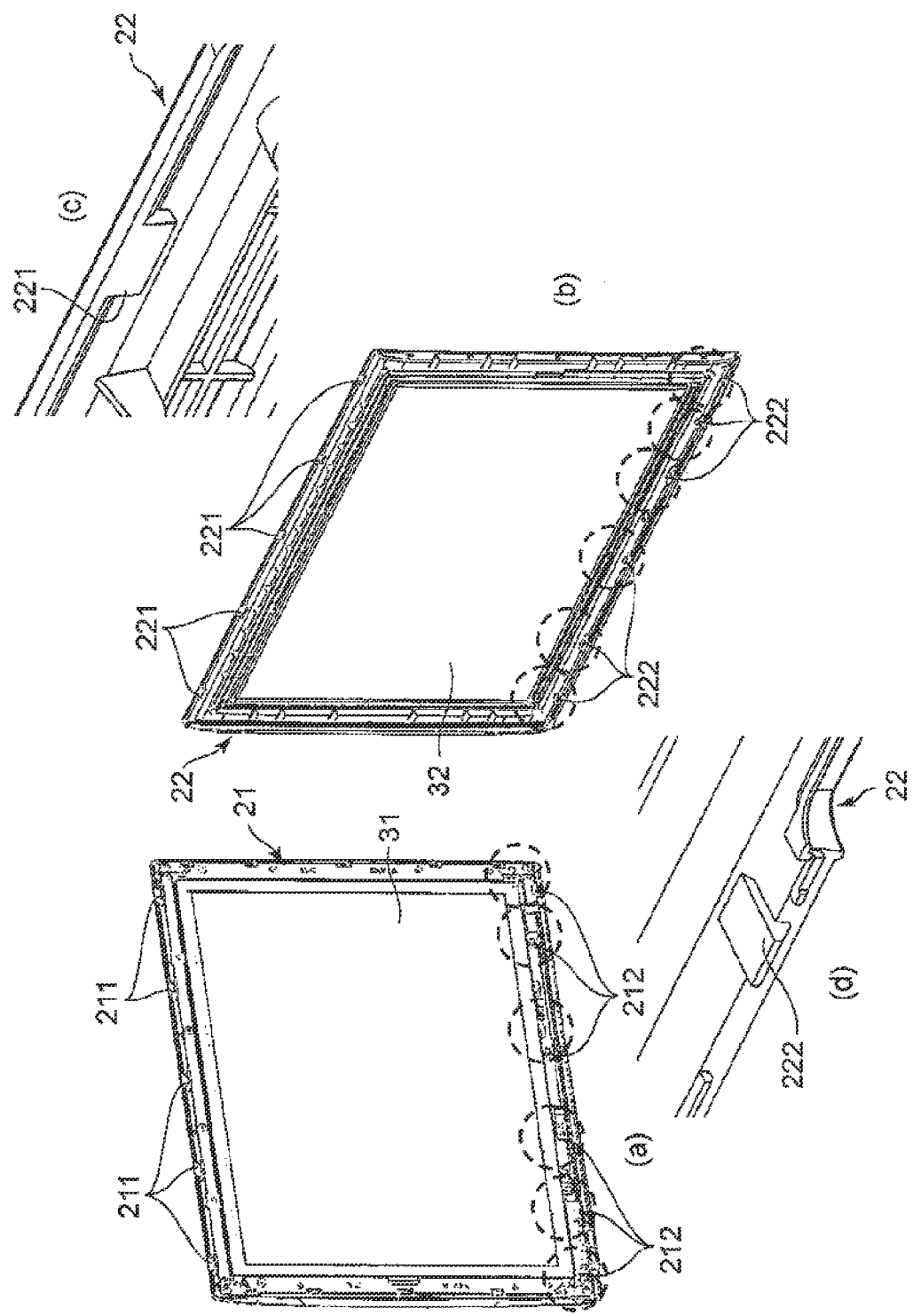
FIG. 3 includes (a) to (d) which are perspective views of a rear case and a front case, for illustrating the touch panel mounting structure in the display device according to the first embodiment of this invention.
Figure 7:
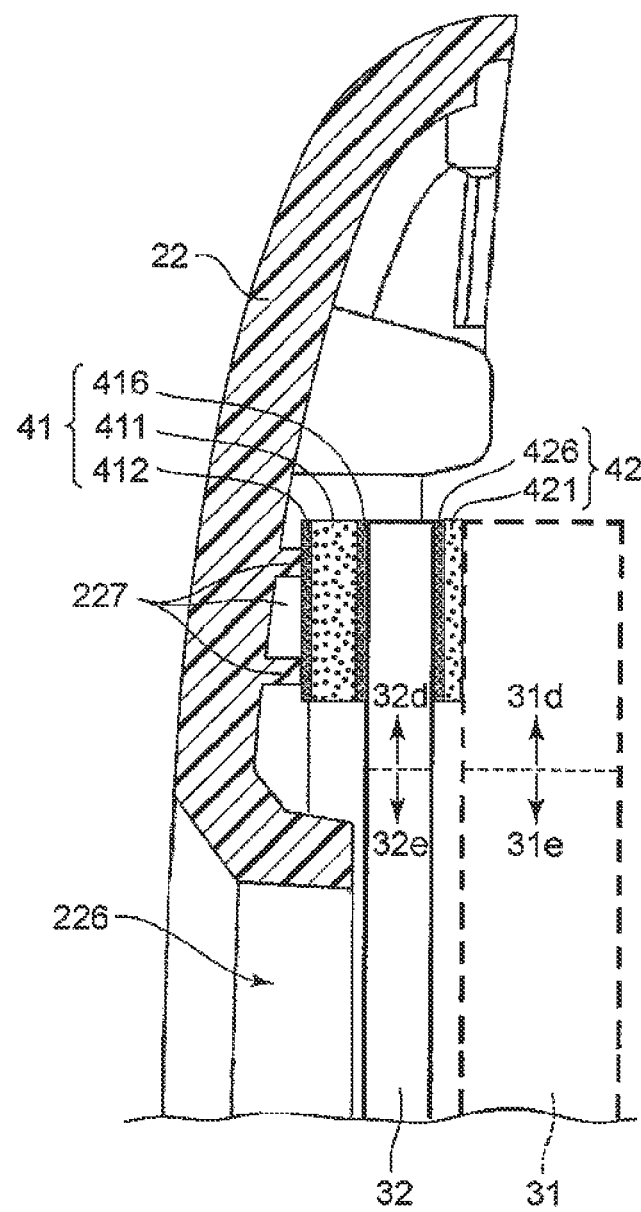
FIG. 7 is a sectional view of the touch panel mounted to the front case, for illustrating the touch panel mounting structure in the display device according to the first embodiment of this invention.

As illustrated in FIGS. 3(a), 3(b), 7, and the like, the display section (display device) 20 of this embodiment includes a display unit 31 such as a liquid crystal panel, a pressure-sensitive or capacitive touch panel 32 stacked on a front part of the display unit 31, and a case made of a resin such as ABS, for housing the touch panel 32 and the display unit 31. The case includes a rear case 21, and a front case 22 removably attached to the rear case 21 and having an opening portion 226 (FIG. 7) for exposing a touch detection region 32e and a visible region 31e of the touch panel 32 and the display unit 31 stacked together.

In the display device of this embodiment, in particular, the display unit 31 is removably attached to the rear case 21, and the touch panel 32 is removably mounted to the front case 22.

First, referring to FIGS. 2 to 6, detailed description is given of a configuration of the case including the rear case 21 and the front case 22.

The front case 22 illustrated in FIG. 2(a) and the like is removably fixed to the rear case 21 without using an attaching and detaching tool.

Referring to FIG. 3(a), the rear case 21 includes five first upward hooks 211, which are formed upward on an upper side of an inner surface of the rear case 21 to define first depressed portions, and six second upward hooks 212, which are formed on a lower side of the inner surface to define second depressed portions.

Referring to FIG. 3(b), on the other hand, the front case 22 includes five first claws 221, which are formed downward on an upper side of an inner surface of the front case 22 corresponding to the first depressed portions defined by the first hooks 211 of the rear case 21, and second claws 222, which are formed on a lower side of the inner surface corresponding to the second depressed portions defined by the second hooks 212 of the rear case 21.

Figure 4:
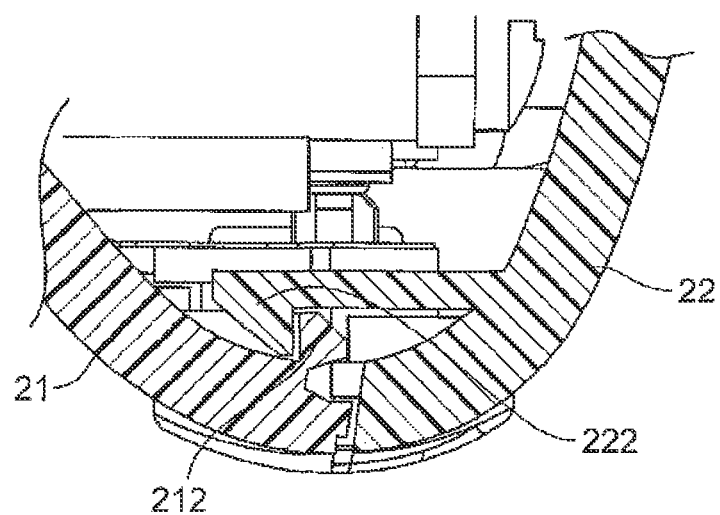
FIG. 4 is a sectional view of the rear case and the front case, for illustrating the touch panel mounting structure in the display device according to the first embodiment of this invention.
Figure 5:
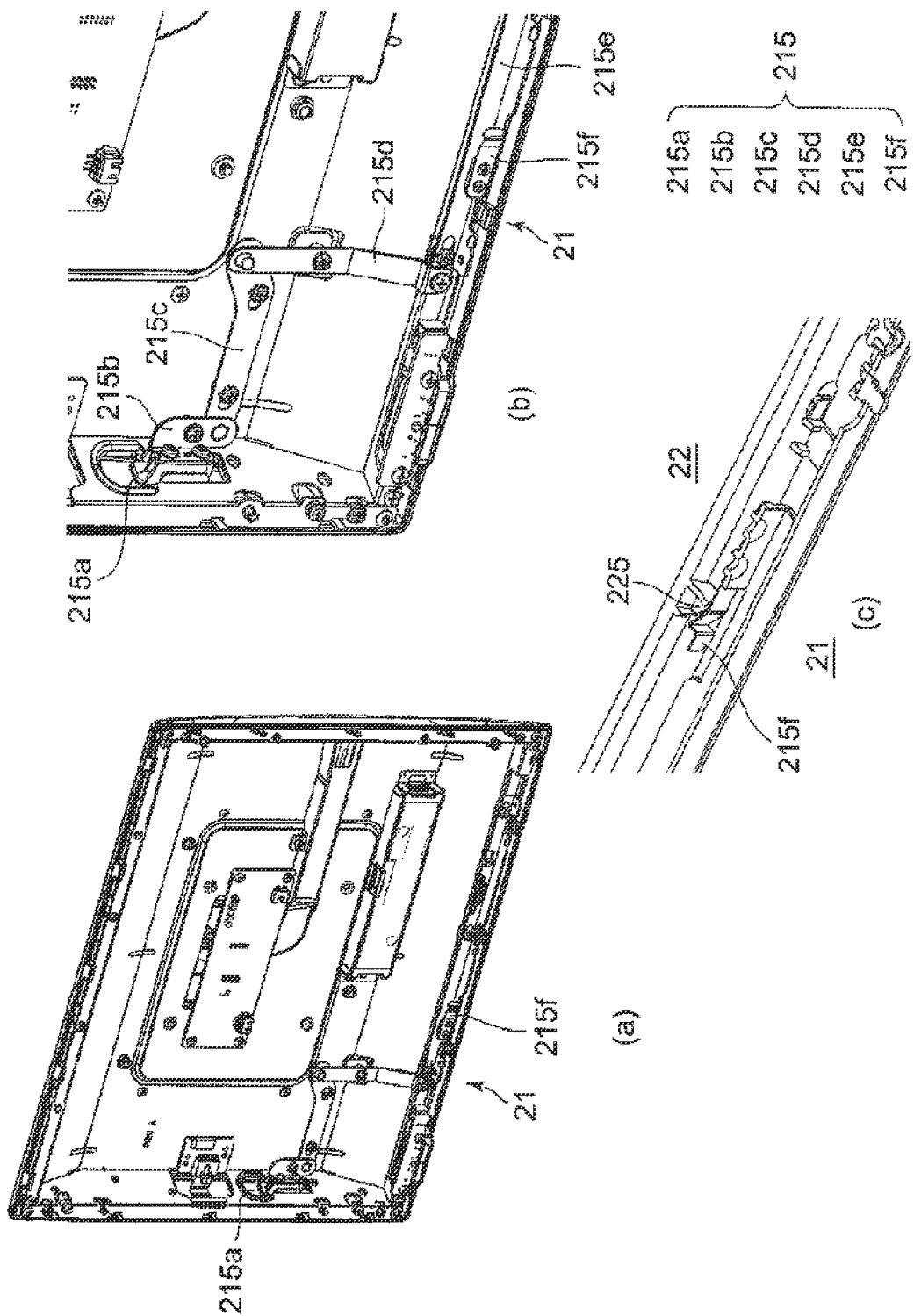
FIG. 5 includes (a) to (c) which are perspective views of the rear case and a disengagement mechanism, for illustrating the touch panel mounting structure in the display device according to the first embodiment of this invention.
Figure 6:
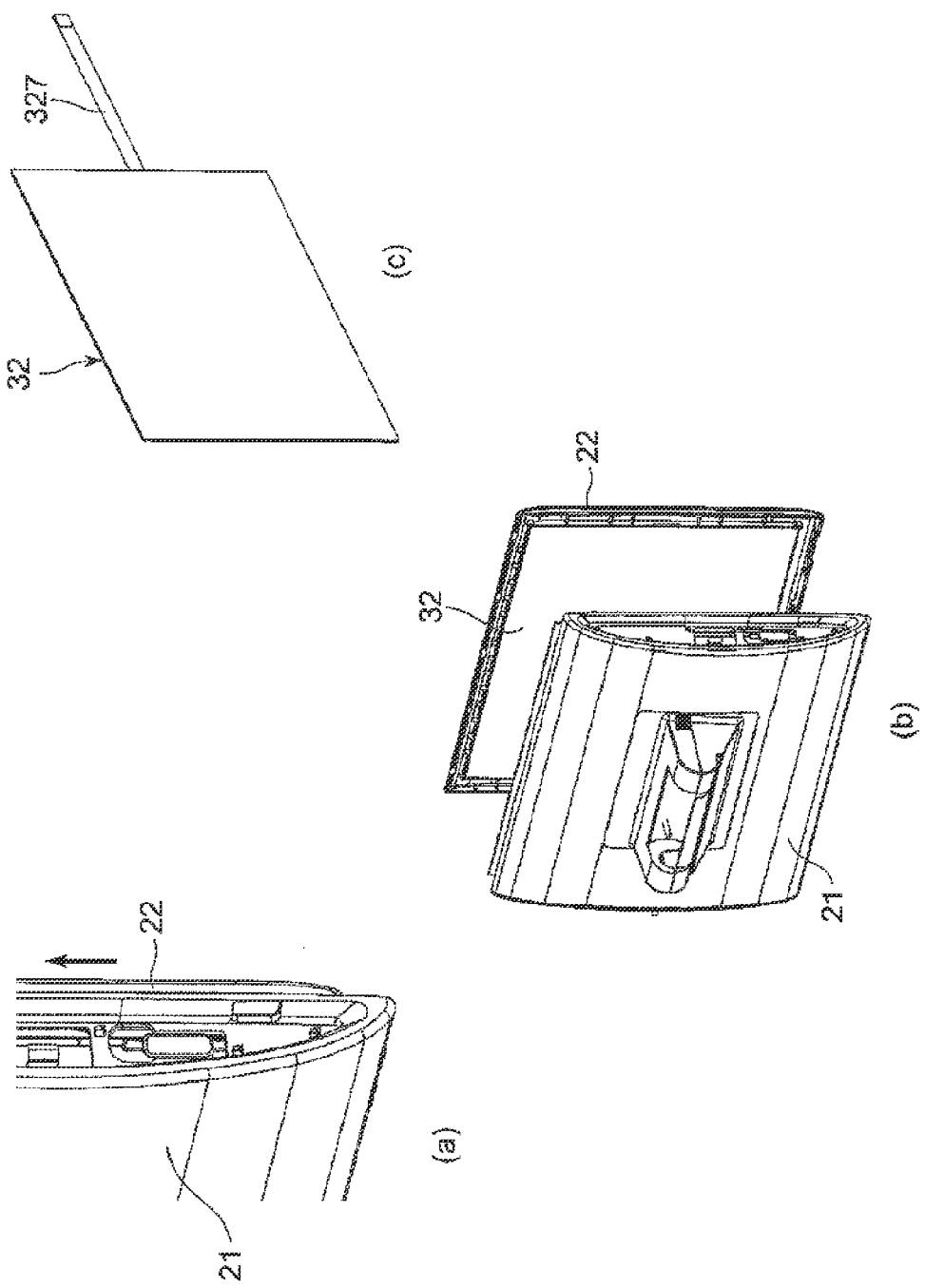
FIG. 6 includes (a) to (c) which are views for illustrating the touch panel mounting structure in the display device according to the first embodiment of this invention.

Further, the first claws 221 of the front case 22 are engaged with the first hooks 211 (first depressed portions) of the rear case 21 from the top, and then, as illustrated in FIG. 4, the second claws 222 of the front case 22 are engaged with the second hooks 212 (second depressed portions) of the rear case 21. In this manner, the front case 22 is removably fixed to the rear case 21 without using an attaching and detaching tool.

Further, as illustrated in FIGS. 5(a) to 5(c), the rear case 21 further includes a disengagement mechanism 215 for disengaging the second claws 222 of the front case 22 from the second hooks 212 (second depressed portions) by pushing the front case 22 fixed to the rear case 21 in response to operation.

The disengagement mechanism 215 includes: a metal operation lever 215b pivotably mounted to the inner surface of the rear case 21 with a screw, having a resin operation tab 215a mounted at one end of the operation lever 215b so as to be exposed through a side surface of the rear case 21, and configured to receive operation from a user; a metal slide member 215c slidably mounted to the inner surface of the rear case 21 with a screw and having one end coupled to the other end of the operation lever 215b with their included angle set variable; a metal pivot member 215d pivotably mounted to the inner surface of the rear case 21 with a screw and having one end coupled to the other end of the slide member 215c; a metal slide member 215e slidably mounted to the inner surface of the rear case 21 with a screw and having one end coupled to the other end of the pivot member 215d with their included angle set variable; and a push member 215f mounted to the slide member 215e by screwing, crimping, or the like.

The push member 215f is formed of an elastic sheet metal. As illustrated in FIG. 5(c), the push member 215f includes a slope portion facing the front case 22 side.

As illustrated in FIG. 5(c), the front case 22, on the other hand, includes a protrusion 225 formed integrally with the resin front case 22 at a position on the lower side of the inner surface, in particular, at a position corresponding to the push member 215f of the disengagement mechanism 215 of the rear case 21. The protrusion 225 includes a slope portion corresponding to that of the push member 215f.

Further, the display section 20 (display device) of this embodiment further includes, as a component of the case, a side panel 23 for covering the side surface between the coupled rear case 21 and front case 22 including the operation tab 215a of the operation lever illustrated in FIG. 2(c). The side panel 23 includes a claw (shown) engageable with a depressed portion (not shown) formed in the side surface between the coupled rear case 21 and front case 22. Due to the engagement relationship therebetween, the side panel 23 is mounted to the coupled rear case 21 and front case 22. Further, as illustrated in FIG. 2(b), a depressed portion 214 for inserting thereinto a coin-like object or the like is formed in the side surface of the rear case 21. Thus, the user inserts a plate-like object accessible to the person who carries out the maintenance inspection or the like, such as a coin, into the depressed portion 214 of the rear case 21, and pulls out a back side of the side panel 23 with a coin or the like, thereby being capable of removing the side panel 23 without using a special attaching and detaching tool. The side panel 23 hides the operation tab 215a of the disengagement mechanism 215, thereby preventing the case from being disassembled inadvertently by a person other than the person who is supposed to carry out the maintenance inspection or the like of the display device. Note that, the depressed portion 214 may be formed to have a size that allows a finger of the person to be inserted thereinto so that the side panel 23 can be removed with the finger of the person instead of using the coin or the like.

By the way, when carrying out the maintenance inspection, repair, or replacement of the built-in devices such as the touch panel 32, the person who is supposed to carry out the maintenance inspection or the like of the display device (referred to tentatively as "service engineer") carries out the following work.

The service engineer inserts a coin or the like into the depressed portion 214 (FIG. 2(b)) formed in the side surface of the display section 20 (display device) illustrated in FIG. 2(a) to remove the side panel 23, thereby bringing the operation tab 215a of the disengagement mechanism into an exposed state as illustrated in FIG. 2(c).

Subsequently, the service engineer pulls and tilts the operation tab 215a (operation lever). Thus, the respective members of the disengagement mechanism 215 illustrated in FIG. 5(b) interlock with each other (slide and pivot), and the push member 215f slides rightward closer to the viewer side in FIG. 5(c). Through the slide of the push member 215f, the protrusion 225 formed on the inner side of the front case 22 is pushed rightward away from the viewer side in FIG. 5(c) by the slope of the push member 215f, and hence the second claws 222 of the front case 22 are disengaged from the second hooks 212 (second depressed portions) formed on the lower side of the rear case 21 illustrated in FIG. 4.

The lower engagement is released, but the first claws 221 formed on the upper side of the front case 22 illustrated in FIG. 3(b) are still engaged with the first hooks 211 (first depressed portions) formed on the upper side of the rear case 21 illustrated in FIG. 3(a). Therefore, the front case 22 is prevented from inadvertently dropping off from the rear case 21 in the process of removing the front case 22.

As illustrated in FIG. 6(a), the service engineer raises the front case 22 slightly to disengage the first claws 221 formed on the upper side of the front case 22 illustrated in FIG. 3(b) from the first hooks 211 (first depressed portions) formed on the upper side of the rear case 21 illustrated in FIG. 3(a).

Subsequently, the service engineer pulls and removes a wiring lead that is led out from the touch panel 32 fixed to the inner surface of the front case 22 as illustrated in FIG. 6(b) and inserted into a connector (not shown) provided inside the rear case 21. Note that, the wiring lead of the touch panel 32 is formed into a shape of, for example, a flexible printed cable (FPC), and for convenience of the description, the wiring lead is represented by reference symbol 327 only in FIG. 6(c) that illustrates the touch panel 32 alone.

In the above-mentioned manner, the touch panel 32 is brought into a state of being removable from the front case 22. Note that, in this state, the display unit 31 is removable from the rear case 21 as well.

Figure 8:
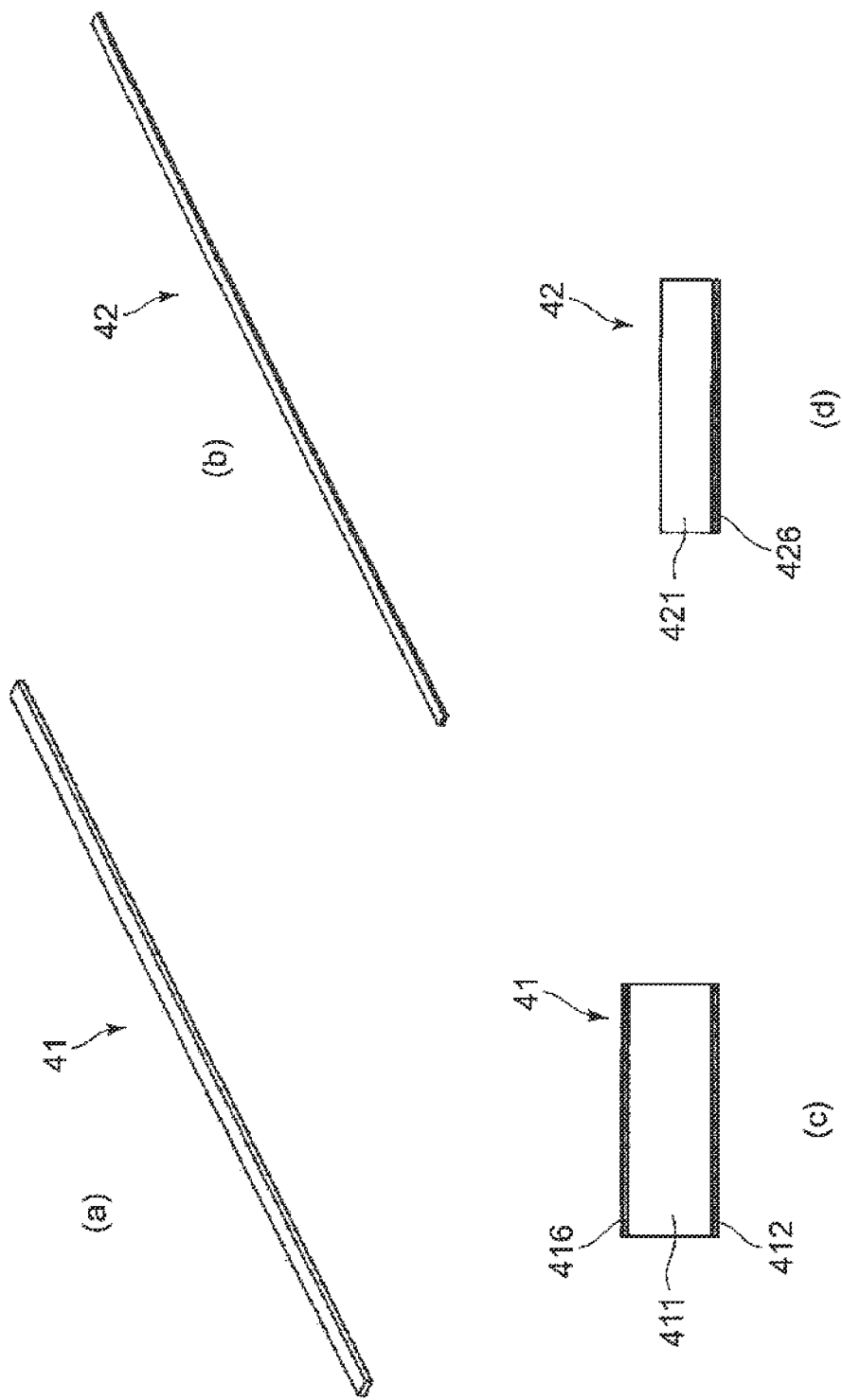
FIG. 8 includes (a) to (d) which are views of cushioning tapes to be used to mount the touch panel, for illustrating the touch panel mounting structure in the display device according to the first embodiment of this invention.

Next, referring to FIGS. 7 and 8, a touch panel mounting structure is described.

Referring to FIG. 7, the display device of this embodiment further includes a first cushioning member 411 provided between a periphery of the opening portion 226 of the front case 22 and a non-touch detection region 32d of a front surface of the touch panel 32.

The first cushioning member 411 includes double-side coated tapes or adhesive layers (in this embodiment, double-side coated tapes 412 and 416) formed on a front surface of the first cushioning member 411, which is opposed to the front case 22, and on a back surface of the first cushioning member 411, which is opposed to the touch panel 32, respectively.

Further, the back surface of the first cushioning member 411 is attached in advance onto the non-touch detection region 32d of the front surface of the touch panel 32 with the double-side coated tape 416, and then the touch panel 32 is attached onto ribs 227, which are formed on the periphery of the opening portion 226 of the front case 22, with the double-side coated tape 412 formed on the front surface of the first cushioning member 411. The touch panel 32 attached with the double-side coated tape or the adhesive layer is easily removable without using an attaching and detaching tool.

Note that, as illustrated in FIGS. 8(a) and 8(c), the first cushioning member 411 forms a first cushioning tape 41 together with the double-side coated tapes 412 and 416. The first cushioning tape 41 is prepared in advance in an elongate state of being rolled around a reel, and is cut off in use to have lengths corresponding to the four edges of the rectangular touch panel 32.

Referring to FIG. 7, the display device of this embodiment further includes a second cushioning member 421 provided between a back surface of the touch panel 32 and an invisible region 31d of the front surface of the display unit 31.

The second cushioning member 421 includes a double-side coated tape or an adhesive layer (in this embodiment, a double-side coated tape 426) formed on a front surface of the second cushioning member 421, which is opposed to the touch panel 32.

Further, the touch panel 32 is mounted to the front case under a state in which the front surface of the second cushioning member 421 is attached in advance, with the double-side coated tape 426, onto a region of the back surface of the touch panel 32 corresponding to the invisible region 31d of the display unit 31. The second cushioning member 421 is configured to prevent interference between the display unit 31 and the touch panel 32 when the front case 22 having the touch panel 32 mounted thereto is coupled to the rear case 21 having the display unit 31 mounted thereto.

Note that, as illustrated in FIGS. 8(b) and 8(d), the second cushioning member 421 forms a second cushioning tape 42 together with the double-side coated tape 426. The second cushioning tape 42 is prepared in advance in an elongate state of being rolled around a reel, and is cut off in use to have lengths corresponding to the four edges of the rectangular touch panel 32.

Second Embodiment

A second embodiment of this invention is different from the first embodiment in the touch panel mounting structure. Therefore, the description of the first embodiment applies to identical or similar parts to those of the first embodiment, and detailed description thereof is omitted herein.

Similarly to the first embodiment, a display device according to the second embodiment of this invention is constructed integrally with the main body of the POS terminal device 10 illustrated in FIGS. 1(a) and 1(b) through an intermediation of the hinge mechanism as the display section 20 on the front side of the POS terminal device. Note that, as illustrated in FIGS. 11(a) and 11(b), the display device according to the second embodiment may also be constructed integrally with the main body of the POS terminal device 10' through an intermediation of the hinge mechanism as each of the display section 20F on the front side of the POS terminal device and the display section 20R on the rear side of the POS terminal device.

Figure 9:
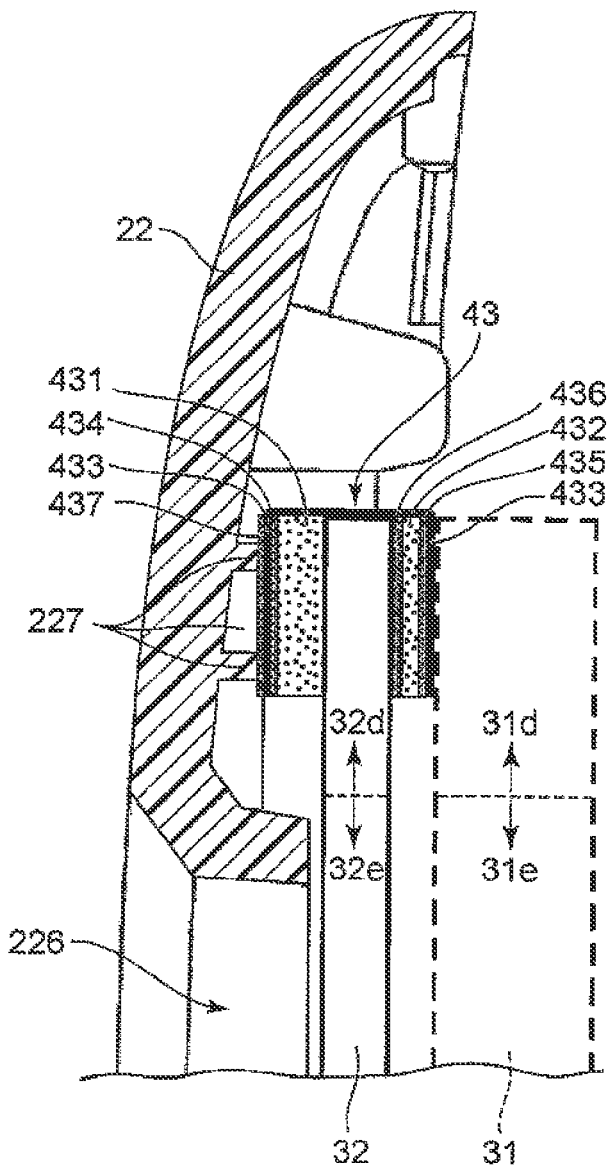
FIG. 9 is a sectional view of a touch panel mounted to a front case, for illustrating a touch panel mounting structure in a display device according to a second embodiment of this invention.

As illustrated in FIG. 9, the display device according to the second embodiment includes the display unit 31 such as a liquid crystal panel, the pressure-sensitive or capacitive touch panel 32 stacked on the front part of the display unit 31, and the case made of a resin such as ABS, for housing the touch panel 32 and the display unit 31. The case includes the rear case, the front case 22 removably attached to the rear case without using an attaching and detaching tool as described in the first embodiment and having the opening portion 226 for exposing the touch detection region 32e and the visible region 31e of the touch panel 32 and the display unit 31 stacked together, and the side panel removably attached to the rear case at the side surface between the coupled rear case and front case 22 without using an attaching and detaching tool as described in the first embodiment.

Further, similarly to the first embodiment, the display device according to the second embodiment includes the disengagement mechanism provided in the rear case.

By the way, similarly to the first embodiment, according to the display device of this embodiment, the display unit 31 is removably attached to the rear case, and the touch panel 32 is removably mounted to the front case 22.

Figure 10:
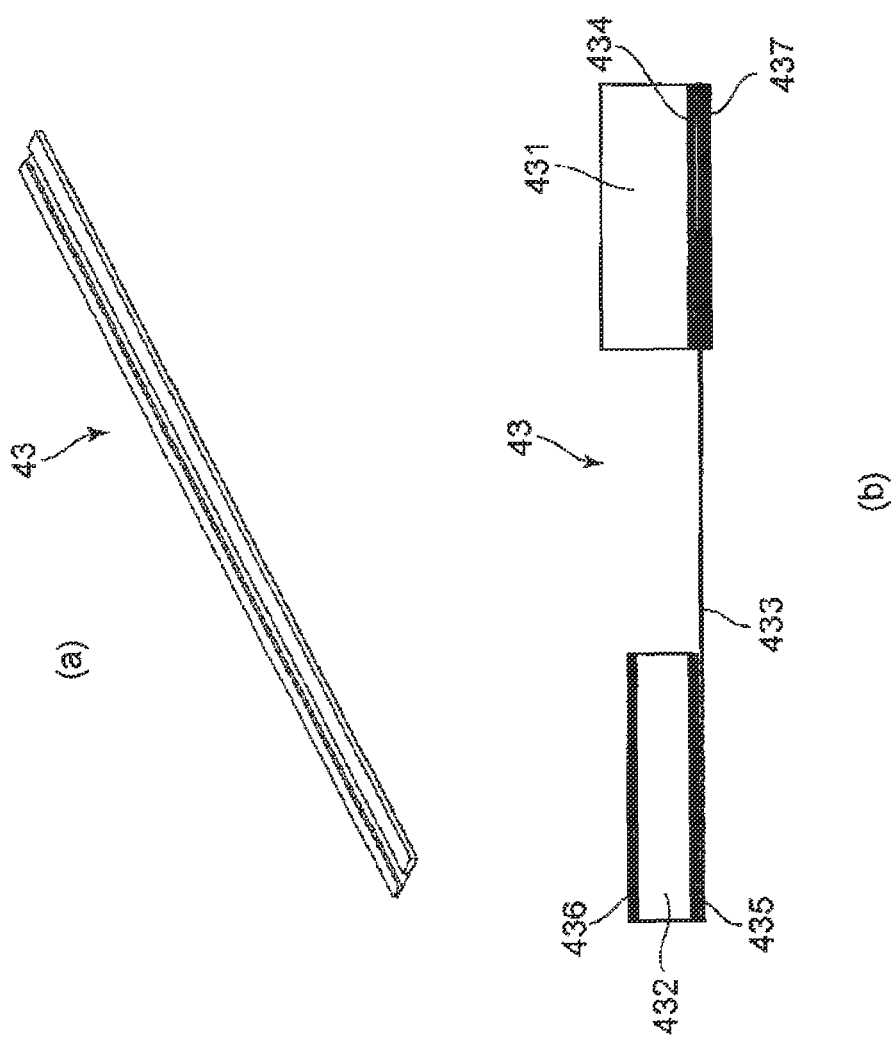
FIG. 10 includes (a) and (b) which are views of a cushioning tape to be used to mount the touch panel, for illustrating the touch panel mounting structure in the display device according to the second embodiment of this invention.

Referring to FIGS. 9 and 10, detailed description is given of a touch panel mounting structure according to the second embodiment.

Referring to FIG. 9, the display device of this embodiment further includes a cushioning tape 43 formed of a first cushioning member 431 provided between the periphery of the opening portion 226 of the front case 22 and the non-touch detection region 32d of the front surface of the touch panel 32, a second cushioning member 432 provided between the back surface of the touch panel 32 and the invisible region 31d of the front surface of the display unit 31, and a film 433 having a flexibility and a width direction, for coupling the first cushioning member 431 and the second cushioning member 432 to each other.

A front surface of the first cushioning member 431 is attached onto a first film surface at one end side of the film 433 in the width direction with a double-side coated tape or an adhesive layer (in this embodiment, a double-side coated tape 434). In addition, the film 433 includes a double-side coated tape or an adhesive layer (in this embodiment, a double-side coated tape 437) formed on a second film surface at one end side of the film 433 in the width direction.

Moreover, a back surface of the second cushioning member 432 is attached onto the first film surface at the other end side of the film 433 in the width direction with a double-side coated tape or an adhesive layer (in this embodiment, a double-side coated tape 435).

Further, the second cushioning member 432 includes a double-side coated tape or an adhesive layer (in this embodiment, a double-side coated tape 436) formed on a front surface of the second cushioning member 432.

Further, the front surface of the second cushioning member 432 is attached in advance, with the double-side coated tape 436, onto a region of the back surface of the touch panel 32 corresponding to the invisible region 31d of the display unit 31. In addition, the cushioning tape 43 is wrapped around the touch panel 32 so that a region of the first film surface of the film 433 at a position between the first cushioning member 431 and the second cushioning member 432 abuts on an end surface of the touch panel 32 (in FIG. 9, an upper end surface), and that a back surface of the first cushioning member 431 abuts on the non-touch detection region 32d of the front surface of the touch panel 32 without intermediation of the double-side coated tape or the adhesive layer. After that, the touch panel 32 is attached onto the ribs 227, which are formed on the periphery of the opening portion 226 of the front case 22, with the double-side coated tape 437 formed on the second film surface of the film 433. The touch panel 32 attached with the double-side coated tape or the adhesive layer is easily removable without using an attaching and detaching tool. Further, the second cushioning member 432 is configured to prevent the interference between the display unit 31 and the touch panel 32 when the front case 22 having the touch panel 32 mounted thereto is coupled to the rear case having the display unit 31 mounted thereto.

Note that, as illustrated in FIGS. 10(a) and 10(b), the first cushioning member 431, the second cushioning member 432, and the film 433 form the cushioning tape 43 together with the double-side coated tapes 437, 434, 435, and 436. The cushioning tape 43 is prepared in advance in an elongate state of being rolled around a reel, and is cut off in use to have lengths corresponding to the four edges of the rectangular touch panel 32.

According to the second embodiment, the number of types of the cushioning tapes for removably fixing the touch panel 32 to the front case 22 can be reduced from two in the first embodiment (first and second cushioning tapes 41 and 42) to one (cushioning tape 43), and the number of steps in the work of attaching the cushioning tapes onto the touch panel in advance is reduced as well. Further, unlike the first cushioning tape 41 according to the first embodiment, the back surface of the first cushioning member 431 of the cushioning tape 43 according to the second embodiment only abuts on but is not attached onto the non-touch detection region 32d of the front surface of the touch panel 32. Therefore, there is no such risk that, in the work of attaching the cushioning member onto the non-touch detection region 32d of the front surface of the touch panel 32, the cushioning member is firmly attached onto the touch detection region 32e with the double-side coated tape or the adhesive layer in an erroneous manner, resulting in erroneous operation of the touch panel 32 and decrease in detection accuracy thereof.

A part or all of the above-mentioned embodiments are described in the following supplementary notes, but are not limited to the following supplementary notes.

(Supplementary Note 1)

A display device, including:
a display unit;
a touch panel stacked on a front part of the display unit; and
a case for housing the touch panel and the display unit,
the case including:
a rear case; and
a front case removably attached to the rear case, the front case having an opening portion for exposing a touch detection region and a visible region of the touch panel and the display unit stacked together,
the display unit being mounted to the rear case,
the touch panel being mounted to the front case.

(Supplementary Note 2)
A display device according to Supplementary Note 1, in which the front case is removably fixed to the rear case without using an attaching and detaching tool.

(Supplementary Note 3)
A display device according to Supplementary Note 1 or 2, further including a first cushioning member provided between a periphery of the opening portion of the front case and a non-touch detection region of a front surface of the touch panel,
the first cushioning member including:
a double-side coated tape or an adhesive layer formed on a front surface of the first cushioning member, which is opposed to the front case; and
a double-side coated tape or an adhesive layer formed on a back surface of the first cushioning member, which is opposed to the touch panel,
in which the touch panel is fixed to the front case with the double-side coated tape or the adhesive layer formed on the front surface of the first cushioning member after the back surface of the first cushioning member is attached onto the front surface of the touch panel in advance.

(Supplementary Note 4)
A display device according to Supplementary Note 3, further including a second cushioning member provided between a back surface of the touch panel and an invisible region of a front surface of the display unit,
the second cushioning member including a double-side coated tape or an adhesive layer formed on a front surface of the second cushioning member, which is opposed to the touch panel,
in which the touch panel is fixed to the front case under a state in which the front surface of the second cushioning member is attached onto the back surface of the touch panel in advance.

(Supplementary Note 5)
A display device according to Supplementary Note 1 or 2, further including a cushioning tape,
the cushioning tape including:
a first cushioning member provided between a periphery of the opening portion of the front case and a non-touch detection region of a front surface of the touch panel;
a second cushioning member provided between a back surface of the touch panel and an invisible region of a front surface of the display unit; and
a film having a flexibility and a width direction, for coupling the first cushioning member and the second cushioning member to each other,
in which a front surface of the first cushioning member is attached onto a first film surface at one end side of the film in the width direction,
in which the film includes a double-side coated tape or an adhesive layer formed on a second film surface at the one end side of the film in the width direction,
in which a back surface of the second cushioning member is further attached onto the first film surface at another end side of the film in the width direction,
in which the second cushioning member includes a double-side coated tape or an adhesive layer formed on a front surface of the second cushioning member, and
in which the touch panel is fixed to the front case with the double-side coated tape or the adhesive layer formed on the second film surface of the film after the front surface of the second cushioning member is attached onto the back surface of the touch panel in advance and the cushioning tape is wrapped around the touch panel so that a region of the first film surface of the film at a position between the first cushioning member and the second cushioning member abuts on an end surface of the touch panel, and that a back surface of the first cushioning member abuts on the front surface of the touch panel.

(Supplementary Note 6)
A display device according to any one of Supplementary Notes 2 to 5,
in which the rear case includes:
a first depressed portion formed upward on an upper side of an inner surface of the rear case; and
a second depressed portion formed on a lower side of the inner surface,
in which the front case includes:
a first claw formed downward on an upper side of an inner surface of the front case corresponding to the first depressed portion of the rear case; and
a second claw formed on a lower side of the inner surface corresponding to the second depressed portion of the rear case, and
in which the first claw of the front case is engaged with the first depressed portion of the rear case from a top, and the second claw of the front case is engaged with the second depressed portion of the rear case so that the front case is removably fixed to the rear case without using the attaching and detaching tool.

(Supplementary Note 7)
A display device according to Supplementary Note 6,
in which the rear case further includes a disengagement mechanism for disengaging the second claw of the front case from the second depressed portion by pushing the front case fixed to the rear case in response to operation,
in which the disengagement mechanism includes an operation lever exposed through a side surface of the rear case, for receiving the operation from a user,
in which the case further includes a side panel for covering the side surface between the rear case and the front case, which are coupled to each other, including the operation lever, and
in which the side panel is removably fixed to the rear case and the front case, which are coupled to each other, without using the attaching and detaching tool.

Industrial Applicability

This invention has been described above with reference to the embodiments, but various modifications understandable for a person having ordinary skill in the art may be made to the configurations and details of this invention. Further, this invention encompasses any appropriate combinations of a part or all of the configurations of the embodiments described above.

For example, the touch panel display device according to this invention is not limited to a touch panel display device constructed integrally with a main body of an electronic device such as the POS terminal device described in the embodiments, and may be provided as a peripheral device to be used concomitantly in an electronic device.

Further, this application is based on and claims the benefit of priority from Japanese Patent Application No. 2011-236745, filed on Oct. 28, 2011, the disclosure of which is incorporated herein by reference in its entirety.

The invention claimed is:
1. A display device, comprising:
a display unit;
a touch panel stacked on a front part of the display unit;
a cushioning tape; and a case for housing the touch panel and the display unit,
the case comprising:
- a rear case; and
- a front case removably attached to the rear case, the front case having an opening portion for exposing a touch detection region of the touch panel and a visible region of the display unit, and the touch panel and the display unit being stacked together, wherein the display unit is mounted to the rear case, and
wherein the touch panel is mounted to the front case so that the front case singly supports and semi-houses the touch panel without cooperation of the rear case,
wherein he cushioning tape comprises:
- a first cushioning member provided between a periphery of the opening portion of the front case and a non-touch detection region of a front surface of the touch panel:
- a second cushioning member provided between a back surface of the touch panel and an invisible region of a front surface of the display unit; and
- a film having a flexibility and a width direction, for coupling the first cushioning member and the second cushioning member to each other, wherein a front surface of the first cushioning member is attached onto a first film surface at one end side of the film in the width direction,
wherein the film comprises a double-side coated tape or an adhesive layer formed on a second film surface at the one end side of the film in the width direction,
wherein a back surface of the second cushioning member is further attached onto the first film surface at another end side of the film in the width direction,
wherein the second cushioning member comprises a double-side coated tape or an adhesive layer formed on a front surface of the second cushioning member,
wherein the cushioning tape is attached to the touch panel so:
- that the front surface of the second cushioning member is attached, by the double-side coated tape or the adhesive layer, on to the back surface of the touch panel,
- that a region of the first film surface of the film at a position between the first cushioning member and the second cushioning member abuts on an end surface of the touch panel, and
- that a back surface of the first cushioning member abuts on the front surface of the touch panel, wherein the front surface of the first cushioning member of the cushioning tape is attached onto the front case by the double-side coated tape or the adhesive layer formed on the second film surface of the film, and
wherein the touch panel to which the cushioning tape is attached is integrated with the front case via the first cushioning member.

2. The display device according to claim 1,
wherein the first cushioning member further comprises:
- a double-side coated tape or an adhesive layer formed on a front surface of the first cushioning member, which is opposed to the front case; and
- a double-side coated tape or an adhesive layer formed on a back surface of the first cushioning member, which is opposed to the touch panel, wherein the back surface of the first cushioning member is attached onto the front surface of the touch panel by the double-side coated tape or the adhesive layer.

3. The display device according to claim 1,
wherein the rear case comprises:
- a first depressed portion formed upward on an upper side of an inner surface of the rear case; and
- a second depressed portion formed on a lower side of the inner surface of the rear case, and wherein the front case comprises:
- a first claw formed downward on an upper side of an inner surface of the front case corresponding to the first depressed portion of the rear case; and
- a second claw formed on a lower side of the inner surface of the front case corresponding to the second depressed portion of the rear case, wherein the first claw of the front case is engaged with the first depressed portion of the rear case from a top, and the second claw of the front case is engaged with the second depressed portion of the rear case so that the front case is removably fixed to the rear case.

4. The display device according to claim 3,
wherein the rear case further comprises a disengagement mechanism at an interface of the front case fixed to the rear case so as to disengage the second claw of the front case from the second depressed portion,
wherein the disengagement mechanism comprises an operation lever exposed through a side surface of the rear case,
wherein the case further comprises a side panel for covering side surfaces of the rear case and the front case, which are coupled to each other, and the exposed operation lever, and
wherein the side panel is removably fixed to the rear case and the front case, which are coupled to each other.

* * * * *